United States Patent Office 3,015,650
Patented Jan. 2, 1962

3,015,650
THERMOPLASTIC POLYESTERURETHANES
Charles S. Schollenberger, Cuyahoga Falls, Ohio, assignor to The B. F. Goodrich Company, New York, N.Y., a corporation of New York
No Drawing. Filed May 7, 1957, Ser. No. 657,484
12 Claims. (Cl. 260—75)

This invention relates to hard thermoplastic polyesterurethanes and relates more particularly to reaction products of polyesters of certain aliphatic glycols and phthalic acids, aromatic diisocyanates and aliphatic glycols.

This invention provides novel hard, tough, essentially non-cross-linked thermoplastic polyesterurethane molding and coating materials which are readily soluble in solvents such as methyl ethyl ketone, but are insoluble in hydrocarbon solvents such as hexane and toluene, which are clear and flexible in thin films and sections, which are abrasion resistant and which have outstanding adhesive and weather resistant properties. Such thermoplastic polyesterurethanes are the linear reaction products of hydroxyl polyesters of a hereinafter defined molecular weight range of aliphatic glycols containing 3 or more carbon atoms and a phthalic acid with an aromatic diisocyanate and an aliphatic glycol. The ratios of reactants while they are kept within hereinafter defined limits may be varied in ratio based on one mol equivalent of the phthalic acid polyester, about 1.1 to about 4 mol equivalents of an aromatic diisocyanate and from about 0.1 to about 3 mol equivalents of aliphatic glycol. The hydroxyl polyesters employed have a molecular weight between about 250 and about 2500. The ratio of aliphatic glycol to aromatic diisocyanate must be balanced so that there are substantially equivalent amounts of polyester and glycol to aromatic diisocyanate so that there is essentially no free unreacted aromatic diisocyanate or aliphatic glycol remaining after the reaction to form the thermoplastic polyesterurethane products.

These cross-link-free thermoplastic polyesterurethanes are quite useful in preparing very hard molded articles of excellent toughness and weather resistance and they possess an unexpected property in that there is little shrinkage of molded articles during or after molding. Quite unexpected also is the solubility of the defined polyesterurethanes in methyl ethyl ketone and ethyl acetate, which solutions may be employed to prepare coatings, producing, after drying, thin, flexible, clear films which have also the outstanding physical properties of these novel tough polyesterurethanes. Thermoplastic polyesterurethanes prepared as described hereinafter have melting points above about 90° C. and Shore D hardness values above about 85.

The polyesters required are essentially hydroxyl terminated polyesters having molecular weights between about 282 and less than about 2500 and an acid number less than 10. More preferably the polyester has a molecular weight from about 338 to about 1000 and a negligible acid number less than 5. The molecular weight may be determined by assay of terminal hydroxyl and carboxyl groups and is an average molecular weight. The polyesters may be prepared readily by an esterification reaction of a phthalic acid with the hereinafter defined aliphatic glycols. When preparing the polyesters by direct esterification, molar ratios of more than one mol of aliphatic glycol to phthalic acid are preferred so as to obtain polyester chains containing a preponderance of terminal hydroxyl groups. The polyesters are normally extracted with water and dried prior to use.

The aliphatic glycols utilized in preparing the polyesters may be any saturated aliphatic glycol containing 3 or more carbon atoms. More preferably, branched chain glycols containing 4 to 10 carbon atoms are employed. Particularly valuable are glycols containing from 5 to 10 carbon atoms and the dialkyl-alkylene carbinol group

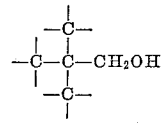

Representative aliphatic glycols include 2-methyl-1,3-propanediol, 2-methyl-1,4-butanediol, 2,2-dimethyl-1,4-butanediol, 2-propyl-1,4-butanediol, 2-methyl-1,5-pentanediol, 3-methyl-1,5-pentanediol, 2,4-dimethyl-1,5-pentanediol, 2-methyl-1,6-hexanediol, 2,5-methyl-1,6-hexanediol, butanediol-1,4, 2,2-dimethyl-1,3-propanediol, 2-methyl-2-ethyl-1,3-propanediol, 2-methyl-2-isopropyl-1,3-propanediol, 2,2-diethyl-1,3-propanediol, 2-methyl-2-butyl-1,3-propanediol and the like. In general, aliphatic glycols of the following general formula are found useful in the preparation of the defined thermoplastic polyesterurethanes

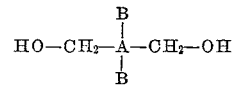

wherein A is alkylene and B is hydrogen or alkyl, each such alkylene or alkyl radical containing from 1 to 5 carbon atoms. A preferred aliphatic glycol is 2,2-dimethyl-1,3-propanediol which is ordinarily identified as neopentyl glycol.

Any phthalic acid of the general formula

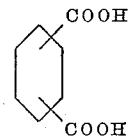

may be employed to make the polyester with the above-defined aliphatic glycols. Such materials include orthophthalic acid, phthalic anhydride, isophthalic acid, terephthalic acid, hexahydrophthalic acid, and the like. Preferred are isophthalic and terephthalic acids.

In the practice of the invention, and a critical feature thereof, an aliphatic glycol including the types described hereinabove is employed as an essential reaction ingredient. It is not necessary that the same aliphatic glycol used to make the polyester be employed as the additional aliphatic glycol but ordinarily it is preferred that the two glycols be the same or similar in physical characteristics. Better results are ordinarily obtained if the aliphatic glycol is mixed with the polyester prior to reaction with the aromatic diisocyanate but it may be added during the reaction of polyester and aromatic diisocyanate or thereafter. The aliphatic glycol preferred is 2,2-dimethyl-1,3-propanediol with glycols of the formula HO—A—OH wherein A is an alkylene radical containing 2 to 6 carbon atoms being quite useful.

The aromatic diisocyanate required for reaction with polyester and aliphatic glycol may be any of the aromatic diisocyanates known to those skilled in the art. Representative aromatic diisocyanates are para-phenylene diisocyanate, 4,4'-bibenzyl diisocyanate, tetrachloro-paraphenylene diisocyanate, tetrachloro-meta-phenylene diisocyanate, dianisidene diisocyanate, benzidine diisocyanate, naphthylene diisocyanate, meta-phenylene diisocyanate, the tolylene diisocyanates, bitolylene diisocyanate, dimers of such diisocyanates and the like. A preferred group of aromatic diisocyanates which contribute enhanced weathering and age resistance to the thermoplastic polyesterurethanes are diisocyanates in which the isocyanate groups are in an unconjugated position with relation to one another such as meta-phenylene diisocyanate and 2,4-tolylene diisocyanate, or are on different phenyl nuclei such as bitolylene diisocyanate, 3,3'-benzidine diisocyanate, diphenyl methane diisocyanate and the like.

As is apparent, the amount and types of reactants may be varied somewhat and as will be apparent from the examples which follow. Such variation may result in desired enhancement of certain physical properties of these thermoplastic polyesterurethanes. Preferred materials are prepared from essentially hydroxyl terminated polyesters of neopentyl glycol and isophthalic or terephthalic acid, having a molecular weight of about 338 to about 800 and an acid number less than 5, reacted in a molar ratio of one mol of polyester, about 1.5 to 2.0 mols of metaphenylene diisocyanate or 2,4-tolylene diisocyanate in the presence of about 0.5 to 1.0 mol of neopentyl glycol or butanediol-1,4 so that there is essentially no free unreacted diisocyanate and glycol remaining in the reaction product. Less than 5% of such materials should be present, if at all, in the final reaction product.

*Example I*

A typical embodiment of the invention is now described in detail. A hydroxyl terminated polyester of molecular weight 800 is prepared by reacting together an excess of neopentyl glycol with isophthalic acid. One-tenth mol of the resulting dry hydroxyl poly (neopentylene isophthalate), acid number about 1, is mixed with 0.07 mol of dry neopentyl glycol by heating together, and to the molten mixture there is then added 0.17 mol of meta-phenylene diisocyanate at a temperature of about 100° C. This mixture is stirred for a few minutes until it starts to thicken and it is then poured into a lubricated metal container which is sealed and placed in an oven at 140° for 3 to 5 hours. The resulting reaction product is a clear amber solid which has a Shore D hardness of 90. The product is tough, is flexible in the form of thin films and is thermoplastic. This product has a second order transition temperature of about 100° C. and a melting point of about 135° C. and is readily molded in suitable molds to form tough molded articles which exhibit a minimum of shrinkage in the mold. Quite unexpectedly this material is readily soluble in methyl ethyl ketone. A 10% solution of the polymer product in methyl ethyl ketone is clear and fluid and may be readily spread with a brush onto metal or glass plates leaving no brush marks. After evaporation of the solvent, a continuous, smooth, hard, glossy film remains which resists marking and scuffing and adheres tenaciously to a metal surface. A thin film of this material exposed for 1200 hours in the dry carbon arc Weather-O-Meter undergoes no discernable physical changes, even retaining gloss, and no appreciable chemical changes in structure as indicated by the infrared spectra of unaged and aged films. Similar age and weather resistance is exhibited after more than 7 months outdoor exposure and the product retains its surface characteristics and there is little or no discoloration of the film. A 20% solution of the polyesterurethane is readily prepared in methyl ethyl ketone containing 10% ethanol. Two thin gauge pieces of 1 x 2 inch steel painted on one surface with this cement and placed together and allowed to dry on a hot plate without pressure forms an excellent composite structure. A force of 95 pounds/square inch is required to shear the two metal pieces apart at a shear rate of 0.05 inch/minute. Excellent bonding results are also obtained with this solution in bonding polyvinyl chloride to steel and cotton fabric to steel.

*Example II*

Example I is essentially repeated with the same polyester having a molecular weight of 488 and the resulting tough product has a second order transition temperature of 109° C., a melting point of 151.5° C., a Shore D hardness of 90 and the product is soluble in methyl ethyl ketone. When this example is repeated with the same polyester having a molecular weight of 662, a material is obtained having a second order of transition temperature of 104.5° C., a melting point of 136.5° C., a Shore D hardness of 91 and is soluble in methyl ethyl ketone. When these examples are repeated with the same polyester having a molecular weight of 1009, a reaction product having a second order of transition temperature of 91.5° C., a melting point of 125° C., a Shore D hardness of 88 is obtained, which is also soluble in methyl ethyl ketone. All of the above described thermoplastic polyesterurethanes are readily moldable materials which have excellent weather resistance and are quite tough, particularly in thin films. All of these materials in addition to being soluble in methyl ethyl ketone are also soluble in dimethyl formamide. When this example was repeated with the same polyester having a molecular weight of about 1400, the resulting polymer product has a second order transition temperature of 87° C., and a melting point of 124° C.

*Example III*

When the above examples are repeated with bitolylene diisocyanate in place of meta-phenylene diisocyanate, a reaction product is obtained having a second order transition temperature of 92° C., a melting point of 132.5° C. and a Shore D hardness of 85. Likewise when para-phenylene diisocyanate or 2,4-tolylene diisocyanate are used to make similar reaction products the physical properties of such materials have the same hardness and roughly equivalent second order transition temperatures and melting points.

*Example IV*

Likewise, when Example I above is repeated with the same polyester and aromatic diisocyanate but with other glycols than neopentyl glycol, similar thermoplastic polyesterurethanes are obtained. For example, with 3-methylpentanediol-1,5 the reaction product has a second order transition temperature of 85° C., a melting point of 114° C. and a Shore D hardness of 87. When 2-methoxy methyl-2,4-dimethyl pentanediol-1,5 is used, the product has a second order transition temperature of 92° C., a melting point of 128° C. and a Shore D hardness of 83. Replacement of neopentyl glycol with butanediol-1,4 results in products having second order of transition temperatures of 89° C., a melting point of 158° C. and a Shore D hardness of 85. In each case these thermoplastic polyesterurethanes are also soluble in methyl ethyl ketone.

*Example V*

Orthophthalic acid, terephthalic acid and hexahydrophthalic acid may be substituted for isophthalic acid in making the required polyesters of this invention. In the case of orthophthalic acid polyesters of neopentyl glycol, having a molecular weight of 765, and employed in a molar ratio of 1.0 to 1.7 to 0.7 as in Example I, a thermoplastic polyesterurethane is obtained having a second order transition temperature of 97° C., a melting point of 139° C. and a Shore D hardness of 89. A similar product prepared from a polyester of terephthalic acid and neopentyl glycol, having a molecular weight of 674, has a second order transition temperature of 109.5° C., a melting point of 163° C. and a Shore D hardness of 81. In the case of a polyester of neopentyl glycol and hexahydrophthalic acid of the same molar ratio of reactants, a thermoplastic reaction product is obtained having a second order transition temperature of 86.5° C., a melting point of 130.5° C. and a Shore D hardness of 90. Each of these materials is readily molded with a minimum of shrinkage during or after molding, are quite impact resistant, are outstandingly resistant to weathering forces, have excellent adhesive properties and are otherwise as valuable as the materials described hereinabove in other examples.

*Example VI*

A series of polyesterurethanes is prepared by the procedure described in the examples above from hydroxyl poly(neopentyl isophthalate) of molecular weight 784, meta-phenylene diisocyanate and neopentyl glycol. The molar ratios of reactants employed in this series are set forth in the table below as the ratio of polyester to meta-phenylene diisocyanate to neopentyl glycol. The resulting products in each case are tough, thermoplastics which are flexible in the form of thin films and in each case are soluble in methyl ethyl ketone.

| Ratio of Reactants | Second Order Transition Point, ° C. | Melting Point, ° C. | Shore D Hardness |
|---|---|---|---|
| 1.0/1.1/0.1 | 89 | 128 | 85 |
| 1.0/1.2/0.2 | 88.5 | 124.5 | 86 |
| 1.0/1.3/0.3 | 91 | 132 | 85 |
| 1.0/1.4/0.4 | 94 | 131 | 86 |
| 1.0/1.5/0.5 | 93.5 | 138 | 85 |
| 1.0/1.6/0.6 | 98 | 139.5 | 86 |
| 1.0/1.7/0.7 | 99 | 138.5 | 86 |
| 1.0/1.8/0.8 | 96.5 | 138 | 87 |
| 1.0/1.9/0.9 | 98 | 136 | 89 |
| 1.0/2.0/1.0 | 96 | 140 | 88 |
| 1.0/3.0/3.0 | 105 | 168 | 88 |
| 1.0/4.0/3.0 | 106.5 | 169 | 90 |

The novel thermoplastic polyesterurethanes of this invention are particularly valuable as coating materials and in coating compositions. These materials in thin film and section are clear and flexible, are abrasion resistant and have outstanding adhesive and weather resistant properties. Such materials readily lend themselves to valuable applications as coatings for metal objects and the like.

These thermoplastic polyesterurethanes are soluble in a variety of solvents including aniline, nitrobenzene, acetone, methyl ethyl ketone, ethyl acetate, isopropyl acetate, cyclohexanone, chloroform, tetrahydrofuran, dioxane, dimethyl formamide, and the like. The solubility of these polyesterurethanes in such solvents as ethyl acetate and methyl ethyl ketone is quite unexpected because of the chemical nature of the thermoplastic materials.

*Example VII*

An example of a clear lacquer which is valuable for metal coating is readily prepared by mixing 184 grams of the polyesterurethane of Example I with 377 ml. of methyl Cellosolve acetate, 207 ml. of ethyl acetate and 212 ml. of toluene. This formulation provides one quart of 20% total solid clear lacquer. The above materials are mixed on a roller for 16 hours. On application with a brush to a clean steel surface excellent leveling is noted and the dried coating adheres tenaciously to the metal, has high gloss and is a continuous, smooth, hard film which resisted marking and scuffing and is outstandingly weather resistant. For spray applications the solids content of this formulation may be reduced with methyl ethyl ketone.

*Example VIII*

Examples of pigmented lacquers may be readily prepared by grinding in a ball mill for 48 hours a mixture of 100 grams of the polyesterurethane of Example I, 200 grams of titanium dioxide, cadmium yellow, cadmium red or cadmium orange, 205 ml. of methyl Cellosolve acetate, 112 ml. of ethyl acetate, and 115 ml. of toluene. 500 ml. of the 20% total solids clear lacquer described above is mixed with this formulation after the grinding in the pebble mill. Blue and black paints may be prepared as described above with somewhat less pigment being employed. This material is readily brushed or sprayed on any desired surface including metals to provide films having physical properties of the nature described above for clear lacquer films. High gloss finishes may be obtained by placing a clear lacquer coat of the nature described above over a film of the pigmented paints above.

In general, valuable coating formulations are prepared by dissolving the thermoplastic polyesterurethane described above in solvents therefor and mixing with the usual paint and lacquer pigments which are well known to those skilled in the art.

In the above examples it will be understood that the second order transition temperature is approximately that temperature at which the thermoplastic polyesterurethane passes from a hard solid state to a rubbery or elastomeric state. The melting points in this case are determined by an extrusion technique and are the temperatures at which the polyesterurethane in a closed container 0.625 inch diameter, under a 1000 pound load, heated at a rate of 0.1 to 0.4° C. per second, flows through a 0.0625 inch diameter orifice at a rate sufficiently greater than normal solid state extrusion to demonstrate a liquefied state.

I claim:

1. A polyesterurethane characterized by being tough and hard, with a Shore D hardness value at least as high as about 85, thermoplastic, linear and essentially free of cross-links, with a second order transition temperature at least as high as about 87° C. and a melting point at least as high as about 100° C., soluble in methyl ethyl ketone and ethyl acetate to give solutions having as high as 10 to 20% total solids, but incapable of dissolving in pure toluene to give such solutions, and capable of forming, from such solutions, clear, flexible abrasion resistant and weather resistant films; said polyesterurethane being the product of the substantially complete reaction of three reactants, said reactants being (A) a hydroxyl terminated polyester of ester forming reactants consisting of (1) a saturated aliphatic diol containing from 5 to 10 carbon atoms of the structure

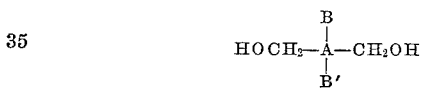

wherein A is a number selected from the class consisting of a tetravalent carbon atom and a saturated tetravalent hydrocarbon group, B is an alkyl group of from 1 to 5 C atoms and B' is a member selected from the class consisting of alkyl groups having from 1 to 5 C atoms and methoxy-methyl, said diol having at least one carbon atom adjacent a $CH_2OH$ group substituted with at least one B and at least one B' group, as defined above with (2) a dicarboxylic acid selected from the class consisting of orthophthalic acid, isophthalic acid, terephthalic acid and hexahydrophthalic acid, said hydroxy-terminated polyester having an average molecular weight from about 250 to 2500 and an acid number less than 10 (B) a saturated aliphatic glycol having from 2 to 10 carbon atoms and only carbon atoms in its longest chain to two of which are attached the two hydroxyl groups and (C) an aromatic diisocyanate and the proportions of said reactants being such that the moles of (C) are substantially equal to the sum of the moles of (A) and (B) and that there are 1.1 to 4 moles of (C) for each mole of (A).

2. A polyesterurethane in accordance with claim 1 further characterized in that the hydroxy polyester (A) has an average molecular weight from about 338 to 800 and an acid number less than 5 and in that there are 1.5 to 2 moles of (C) for each mole of (A).

3. A polyesterurethane in accordance with claim 2 further characterized in that the saturated aliphatic diol component (1) of the hydroxyl terminated polyester (A) is neopentyl glycol.

4. A polyesterurethane in accordance with claim 3 further characterized in that the saturated aliphatic glycol (B) possesses the formula HO—A—OH wherein A is an alkylene radical containing 2 to 6 carbon atoms.

5. A polyesterurethane in accordance with claim 4 further characterized in that the aromatic diisocyanate (C) is meta-phenylene diisocyanate.

6. A polyesterurethane in accordance with claim 5 further characterized in that the carboxylic acid component of the hydroxyl polyester (A) is isophthalic acid and the saturated aliphatic glycol (B) is neopentyl glycol.

7. A polyesterurethane in accordance with claim 5 further characterized in that the acid component of hydroxyl polyester (A) is terephthalic acid and the saturated aliphatic glycol (B) is neopentyl glycol.

8. A polyesterurethane in accordance with claim 5 further characterized in that the carboxylic acid component of the hydroxyl polyester (A) is isophthalic acid and the saturated aliphatic glycol (B) is butanediol-1,4.

9. A polyesterurethane in accordance with claim 4 further characterized in that the aromatic diisocyanate (C) is 2,4-tolylene diisocyanate.

10. A polyesterurethane in accordance with claim 9 further characterized in that the carboxylic acid component of the hydroxyl polyester (A) is isophthalic acid and the saturated aliphatic glycol (B) is neopentyl glycol.

11. A polyesterurethane in accordance with claim 4 further characterized in that the aromatic diisocyanate (C) is a diisocyanate having its isocyanate radicals on different phenylene nuclei.

12. A polyesterurethane in accordance with claim 11 further characterized in that the carboxylic acid component of the hydroxyl polyester (A) is isophthalic acid, the saturated aliphatic glycol (B) is neopentyl glycol and the aromatic diisocyanate (C) is bitolylene diisocyanate.

References Cited in the file of this patent

UNITED STATES PATENTS

| | | |
|---|---|---|
| 2,621,166 | Schmidt | Dec. 9, 1952 |
| 2,729,618 | Muller et al. | Jan. 3, 1956 |
| 2,755,266 | Brenschede | July 17, 1956 |
| 2,764,565 | Hoppe et al. | Sept. 25, 1956 |
| 2,861,981 | Frank et al. | Nov. 25, 1958 |
| 2,905,652 | Best et al. | Sept. 22, 1959 |
| 2,912,408 | Nischk et al. | Nov. 10, 1959 |

FOREIGN PATENTS

| | | |
|---|---|---|
| 959,679 | Germany | Mar. 7, 1957 |